United States Patent [19]

Egawa

[11] Patent Number: 5,396,305
[45] Date of Patent: Mar. 7, 1995

[54] DATA RECORDING CAMERA SYSTEM

[75] Inventor: Akira Egawa, Tokyo, Japan

[73] Assignee: Canon Kabushiki Kaisha, Tokyo, Japan

[21] Appl. No.: 225,504

[22] Filed: Apr. 11, 1994

Related U.S. Application Data

[63] Continuation of Ser. No. 942,346, Sep. 9, 1992, abandoned, which is a continuation of Ser. No. 666,492, Mar. 6, 1991, abandoned, which is a continuation of Ser. No. 569,759, Aug. 21, 1990, abandoned, which is a continuation of Ser. No. 441,166, Nov. 27, 1989, abandoned.

[30] Foreign Application Priority Data

Nov. 30, 1988 [JP] Japan .................. 63-304851
Nov. 30, 1988 [JP] Japan .................. 63-304852

[51] Int. Cl.⁶ .............................. G03B 29/00
[52] U.S. Cl. ........................... 354/76; 354/106
[58] Field of Search ............ 354/75, 76, 105–109, 354/289.1–289.12

[56] References Cited

U.S. PATENT DOCUMENTS

4,728,978  3/1988  Inoue et al. ............... 354/106
4,825,233  4/1989  Kanai et al. ............... 354/106

FOREIGN PATENT DOCUMENTS

59-69744  4/1984  Japan .
62-50743  3/1987  Japan .
62-111248  5/1987  Japan .

*Primary Examiner*—David M. Gray
*Attorney, Agent, or Firm*—Robin, Blecker, Daley & Driscoll

[57] ABSTRACT

A data recording camera system includes first recording means for recording time data either on a photographic photosensitive means such as a film or on a matter that is ancillary to the film or the like, such as a film containing cartridge; second recording means for recording information on the format of printing the time data or area data in addition to the time data; and printing means for recording, on a print, time data formed on the basis of the data and information obtained from the first and second recording means.

66 Claims, 15 Drawing Sheets

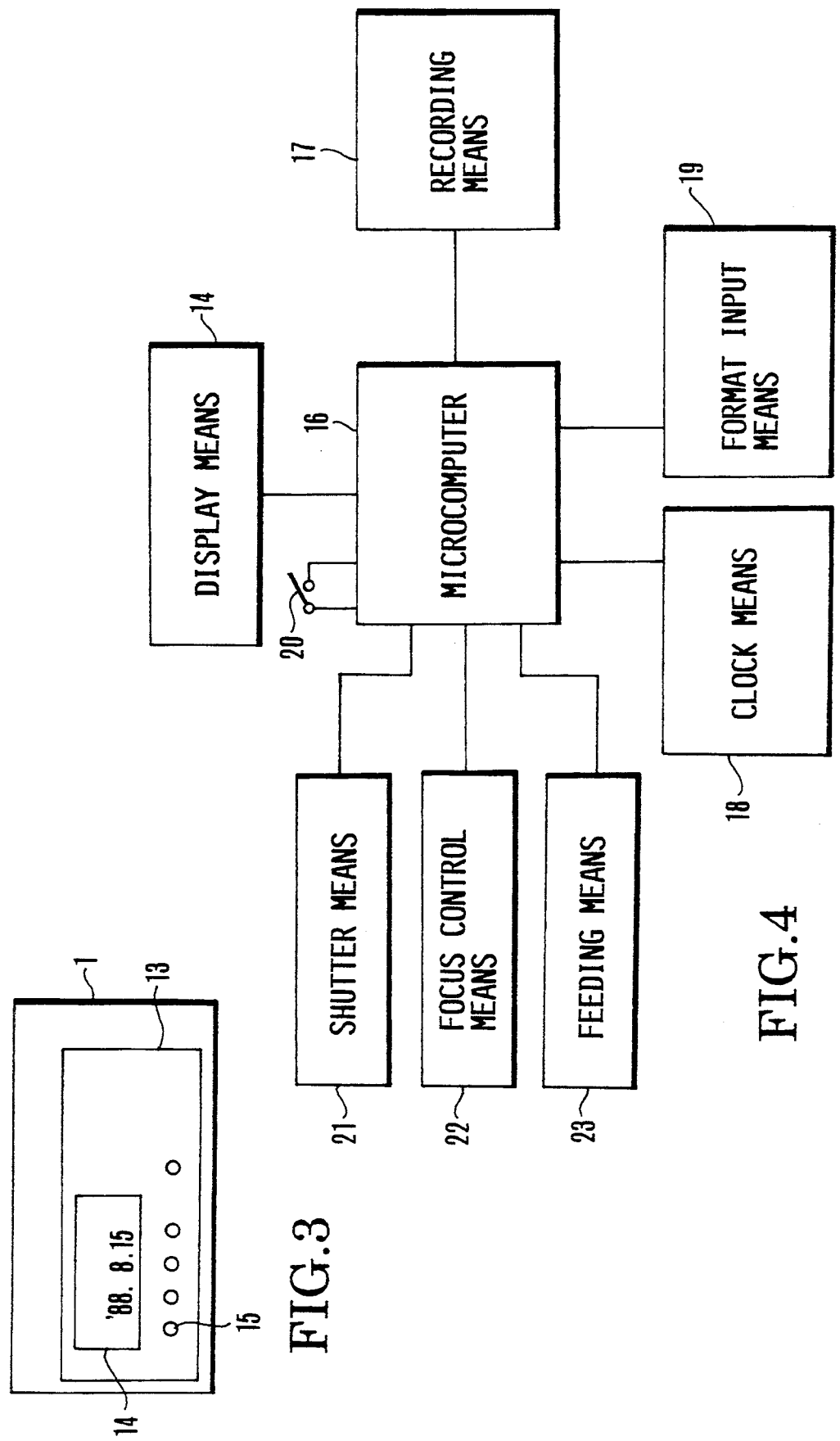

DATA RECORDING CAMERA SYSTEM

This is a continuation application under 37 CFR 1.62 of prior application Ser. No. 07/942,346, filed Sep. 9, 1992 (abandoned), which is a continuation of Ser. No. 07/666,492, filed Mar. 6, 1991 (abandoned), which is a continuation of Ser. No. 07/569,759, filed Aug. 21, 1990 (abandoned), which is a continuation of Ser. No. 07/441,166, filed Nov. 27, 1989 (abandoned).

BACKGROUND OF THE INVENTION

1. Field of the Invention

This invention relates to a data recording camera system and more particularly to a camera system which records and prints time data such as a date, etc., on photographic photosensitive means such as a film.

2. Description of the Related Art

All the data recording camera systems of the above-stated kind have been arranged to imprint the data in digits and/or letters in a corner of a picture in a manner that permits confirmation by the photographer.

For example, the digit or figure recording arrangement has been as follows: A seven-segment liquid crystal element is used for each figure. Including day, hour and minute, the recording date display requires a total of six figures. The date is imprinted, in synchronism with a shutter release operation, on the basis of time data from a clock disposed within the camera.

However, only a single style of type has been employed in general for the data to be imprinted. It has been generally impossible to select styles of figures, English letters, Chinese characters and other languages as desired. Further, the number of characters and figures that can be imprinted is limited. Only one format of imprinting data, such as "year-month-day" or "day-hour-minute" has been selectable.

Further, since the data is recorded within a picture taken, the imprinted data has sometimes been hardly legible because of insufficient contrast, for example, in the event of bright background of the picture. Another problem resides in that the data might be excluded from a printed picture if the imprint position of the data happens to be outside a trimming frame when the picture is trimmed in printing.

Further, in cases where the camera is carried for photographing on a travel overseas, there is a difference between home time and local time. The clock data within the camera must be adjusted to the local time. If the travel covers a plurality of foreign countries, the clock data must be adjusted, for example, on an airplane every time it flies from one country to another. Such adjustment has been quite troublesome. Besides, some countries such as the U.S.A. require change-over from summer time to winter time. This change-over then further complicates the time adjusting work. The traveler is further required to make readjustment back to the home time on returning home. In some case, the international date line passing time cannot be found. In such a case, it is hardly possible to find timing for adjustment of the clock data. Besides, the conventional camera of this kind has necessitated a long period of time for a troublesome operation on operation buttons provided only in a few number for gradual adjustment of the hour, minute, etc. Hence, improvement in this respect has been desired.

SUMMARY OF THE INVENTION

This invention is directed to the solution of the above-stated problem of the prior art. It is therefore an object of the invention to provide a data recording camera system which is capable of eliminating the shortcoming of the conventional camera system by improving the function and operability of the camera system.

To attain this object, the data recording camera system according to this invention comprises: first recording means for recording time data on a photographic photosensitive means such as a film or on something ancillary to the photosensitive means such as a cartridge containing the photosensitive means; second recording means for recording information on a time data printing format, area data, etc., in addition to the time data; and printing means for printing time data based on the data and information of the first and second recording means.

The above and other objects and features of the invention will become apparent from the following detailed description of embodiments thereof taken in connection with the accompanying drawings.

BRIEF DESCRIPTION OF THE DRAWINGS

FIG. 3 is a rear view showing the same camera with the back lid attached to the camera.

FIG. 4 is a block diagram showing the circuit arrangement of the camera of FIG. 1.

DETAILED DESCRIPTION OF THE PREFERRED EMBODIMENTS

Figure 1:
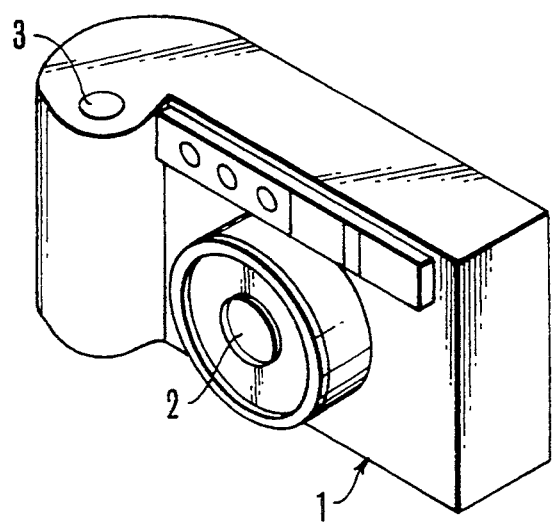
FIG. 1 is an oblique view showing a camera which is arranged according to this invention as an embodiment thereof.
Figure 2:
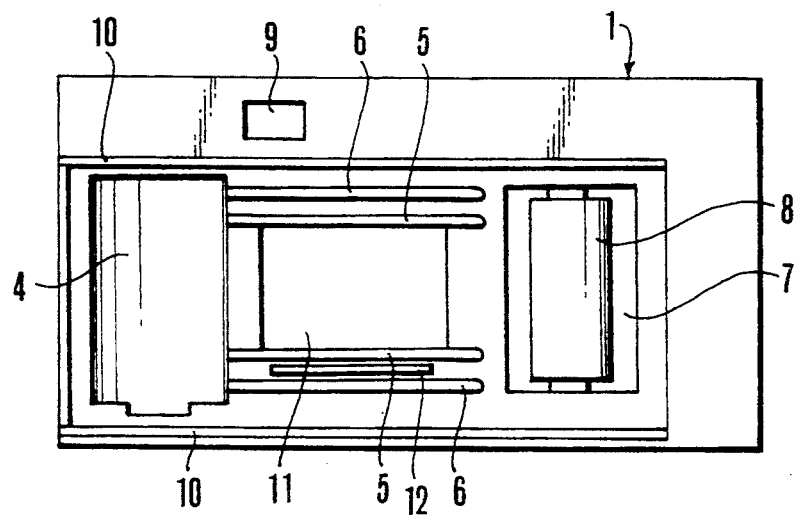
FIG. 2 is a rear view showing the same camera with the back lid of the camera removed.

An embodiment of the invention is arranged as described below with reference to the drawings:

FIG. 1 is an oblique view of a camera to which this invention is applied. The illustration includes a camera body 1; a photo-taking lens 2; and a shutter release button 3. FIG. 2 is a rear view showing the camera body 1 with the back lid thereof removed. Referring to FIG. 2, a cartridge chamber 4 is arranged to have a film cartridge placed therein. A pair of upper and lower inner rails 5 are arranged to define a film position in the direction of an optical axis. A pair of upper and lower outer rails 6 are arranged to define a film position in the vertical direction. The illustration includes a spool chamber 7; a spool 8 which is arranged to take up the film; a view finder 9; a back lid groove 10 which is arranged to have the back lid fitted therein; an aperture 11; and an imprinting unit 12 which is arranged below the aperture 11 to imprint on the film a plurality of data including time data and format information and consists of, for example, a liquid crystal member and a light emitting member. For example, a light emitting diode is employed as the light emitting member. FIG. 3 is a rear view showing the camera body 1 of FIG. 1 with the back lid on. Referring to FIG. 3, the back lid 13 is pivotally attached to the camera body 1 and can be opened and closed as desired. Display means 14 consists of an LCD, etc., and is disposed on the back lid 13. Operation means 15 consists of push buttons.

FIG. 4 is a block diagram showing the electric circuit arrangement of the camera of this embodiment. Referring to FIG. 4, a microcomputer 16 is arranged to control the sequence of photographing processes, recording of information including time data and its format information and an interface between the camera and a peripheral circuit. The display means 14 (shown also in FIG. 3) is arranged to display the date, a frame number, etc. Recording means 17 is arranged to imprint on the film time data and information on the format thereof in conjunction with the above-stated imprinting unit 12. Clock means 18 is arranged to accurately count the year, month and day or the hour, minute and second. Format input means 19 is arranged to supply the format information on the time data to the microcomputer 16. A release switch 20 is arranged to be closed in response to a pushing operation performed on the release button 3 of FIG. 1. Shutter means 21 is arranged in a known manner to control an exposure. Focus control means 22 is arranged in a known manner to have the lens of the camera focused on an object to be photographed. Film feeding means 23 is arranged to feed the film.

Figure 5:
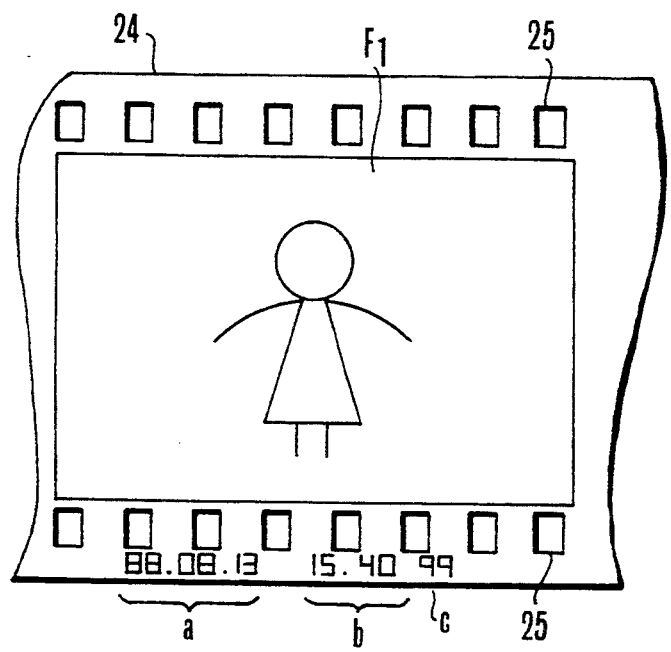
FIG. 5 is a plan view showing a frame F1 of a photographing film.
Figures 6A, 6B:
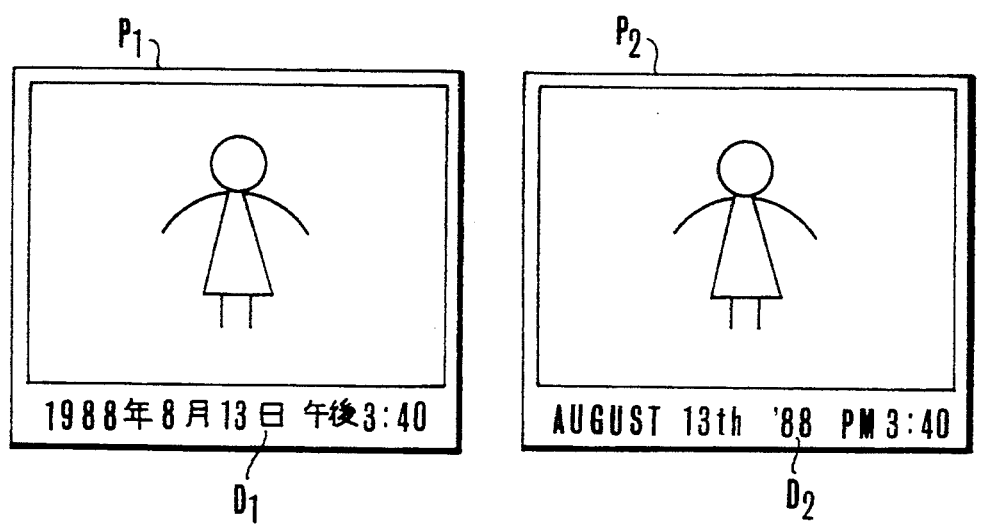
FIGS. 6(a) and 6(b) are plan views showing print examples obtained from the same frame F1.
Figure 7:
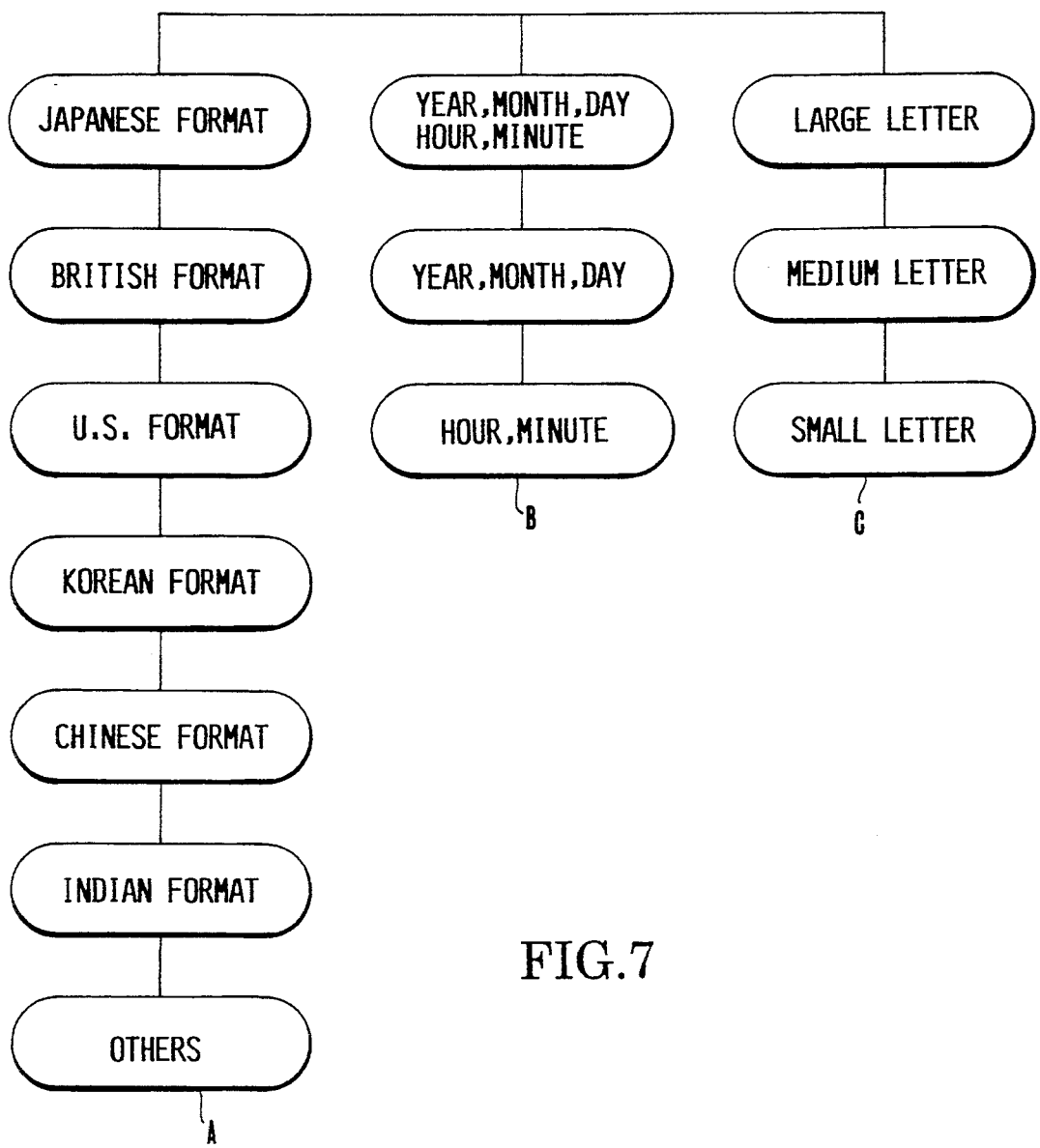
FIG. 7 shows an example of format information.

In recording data on the film, the embodiment operates as follows: FIG. 5 shows by way of example a frame F1 of film on which data is recorded. FIGS. 6(a) and 6(b) are plan views showing by way of example prints obtained from the frame F1 of FIG. 5. FIG. 7 shows by way of example the format information. In these figures, a reference numeral 24 denotes the film. A numeral 25 denotes known perforation arranged at even pitches along edges extending in parallel on both sides of the film 24. The film 24 is shown as viewed from the front side of the camera body 1. A reference symbol F1 denotes a photographed frame of the film. Information of different data combinations "a", "b" and "c" represent imprinted data imprinted for the frame F1 by the above-stated recording means 17. The data "a", "b" and "c" are recorded on the outside of the frame F1. The data "a" shows "year, month and day". The data "b" shows "hour and minutes". The data "c" shows the "format". Since these data "a", "b" and "c" are arranged to be recorded on the film in the case of this embodiment, liquid crystal elements of the seven segments type are used in the same manner as the conventional date imprinting device. Therefore, the arrangement of the embodiment readily permits the use of the conventional date imprinting device. Further, since the data are imprinted on the outside of the picture, a printed picture is never affected by the data. Since the data "a" and "b" which relate to time and the data "c" which relates to the format thereof are imprinted on the outside of the film frame, no printed picture will be affected by the imprinted data. The time data can be imprinted on a print by a printer in accordance with a desired format after the film 24 is processed by a printing device which will be described later herein. For example, in the case of FIG. 6(a), data D1 which is in accordance with a format mainly consisting of Chinese characters is printed on a print P1. In FIG. 6(b), data D2 which is in accordance with a format mainly consisting of English letters are printed on a print P2. In these cases, the data D1 and D2 are of course imprinted on the outside of the frames of the printed pictures. In FIG. 7, a format group A includes formats differently arranged by countries. Since the mode of display varies with the country, an applicable format is selected out of these formats. A format group B is provided for varying the amount of data. A format group C is provided for selection of the size of the letters to be imprinted.

Figure 8:
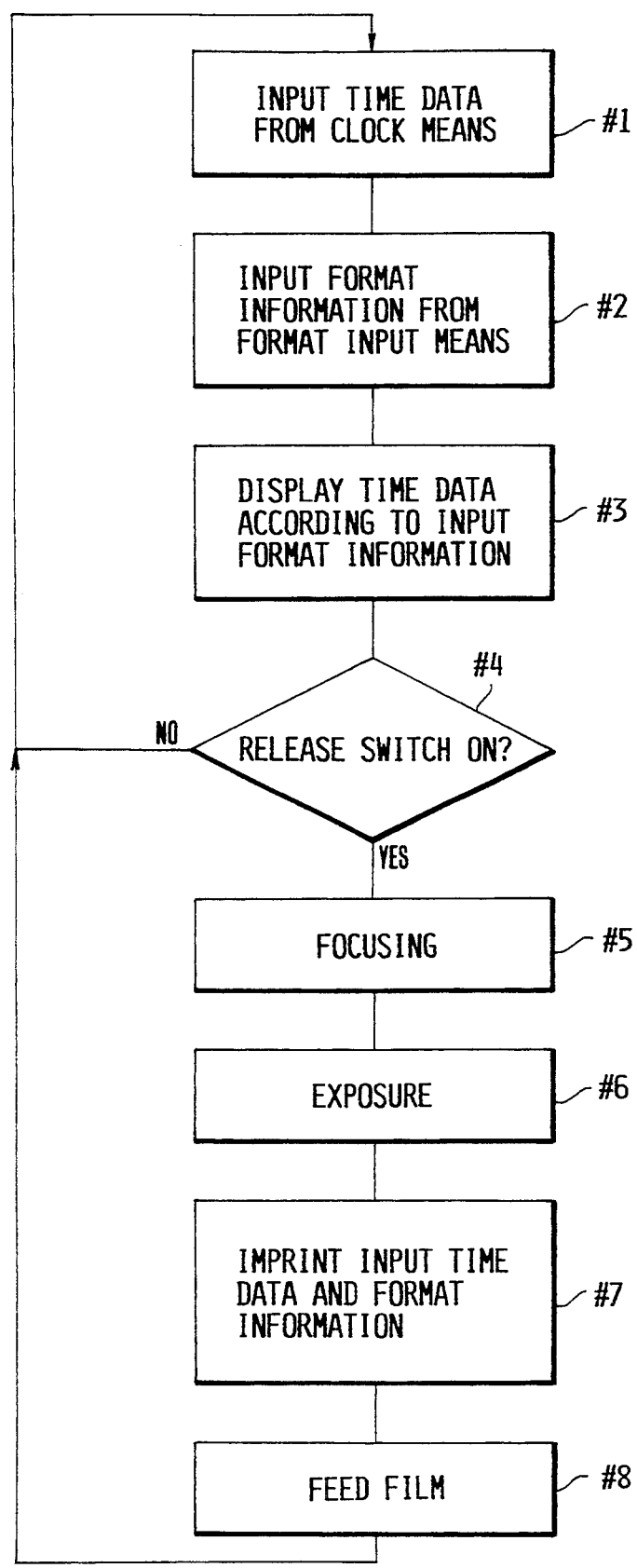
FIG. 8 is a flow chart showing the operation of the circuit arrangement shown in FIG. 4.

Next, the operation of the camera of this embodiment is described as follows with reference to FIG. 8 which is a flow chart: At a step #1 of the flow chart, the microcomputer 16 receives from the clock means 18 the time data including the data of year, month, day, hour, minute and second. At a step #2: The microcomputer 16 receives from the format input means 19 the format information of FIG. 7 set by the operation means 15. At a step #3: The time data thus received is displayed by the display means 14 in a mode according to the format information received.

At a step #4: The microcomputer 16 makes a check for the position of the release switch 20. If the switch 20 is found to be not closed (or not in an on-state), the flow of operation comes back to the step #1 to repeat the steps #1 to #3 and to have the latest time data displayed by the display means 14 in accordance with the format information last selected. If the release switch 20 is found to be closed at the step #4, the flow comes to a step #5. At the step #5: The focus control means 22 is caused to perform a focusing action. The flow then comes to a step #6. At the step #6: The shutter means 21 is caused to perform an exposure action. At a step #7, the time data and the format information displayed by the display means 14 are imprinted on the outside of the film frame by the recording means 17.

At a step #8: Upon completion of the imprinting action of the recording means 17, the film feeding means 23 is caused to feed the film for a next photographing operation. After the step #8, the flow of operation comes back to the step #1 to repeat the above-stated steps.

Figure 9:
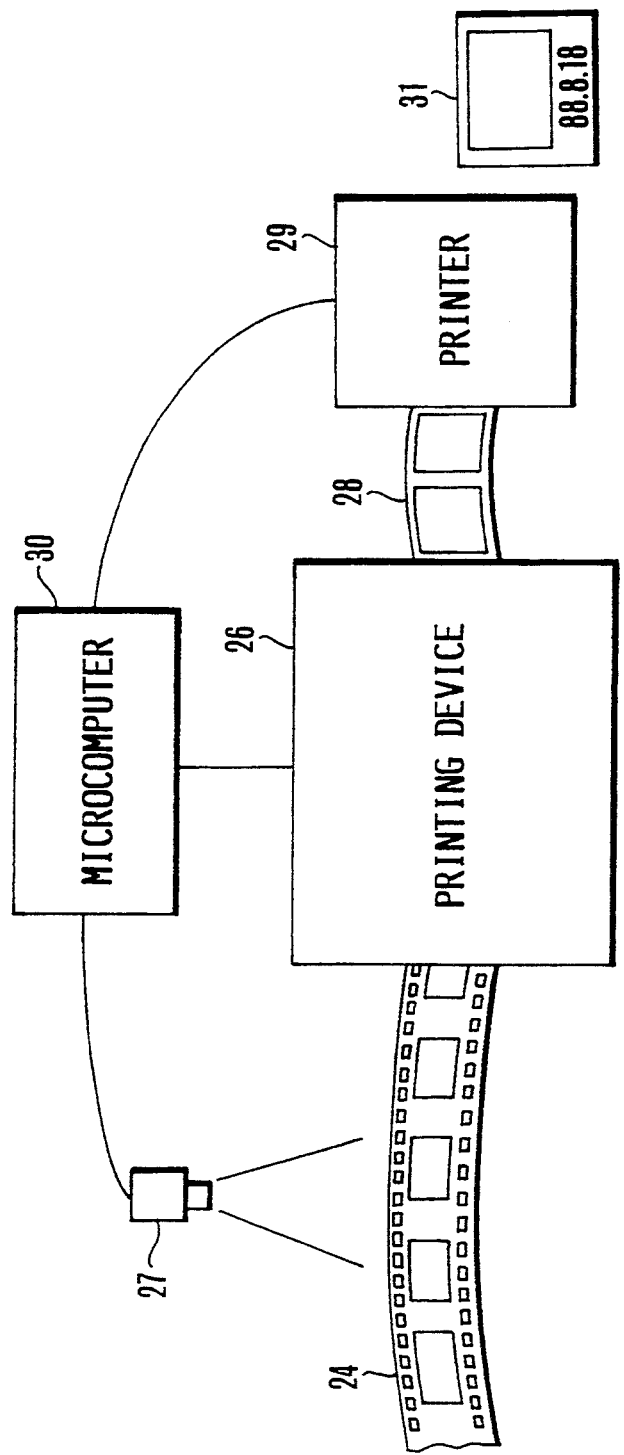
FIG. 9 is a schematic illustration of the printing device of the same embodiment.
Figure 10:
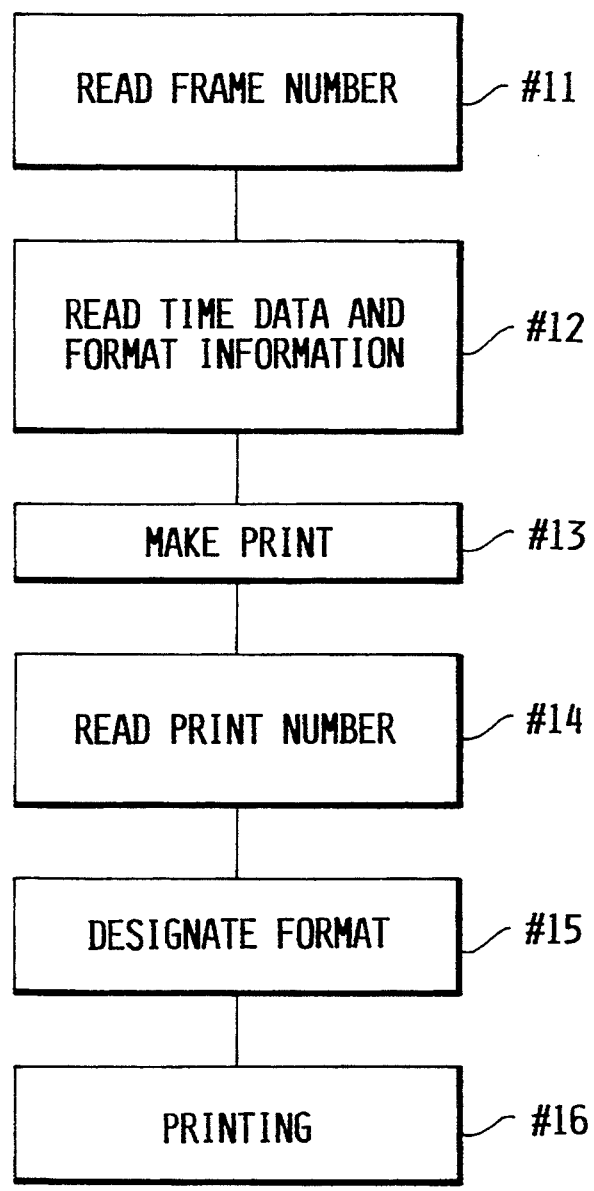
FIG. 10 is a flow chart showing the operation of the printing device of FIG. 9.

FIG. 9 schematically shows the printing device of this embodiment. FIG. 10 is a flow chart showing the operation of the printing device. Referring to FIG. 9, the data "a", "b" and "c" mentioned in the foregoing have already been recorded on the film 24 by the camera. A reference numeral 26 denotes the printing device. A numeral 27 denotes a camera which is arranged to read the data "a", "b" and "c" imprinted on the film 24. A numeral 28 denotes continuous prints. A numeral 29 denotes a printer. The printer 29 records the time data including the date, etc., in accordance with a format read out. A microcomputer 30 is arranged to control the printing device 26, the camera 27 and the printer 29. A print 31 is cut and ejected from the printer 29.

The printing device of FIG. 9 operates as follows: When the film (the so-called negative film) which has been developed with the data "a", "b" and "c" imprinted comes into the printing device 26, the print 28 is obtained by printing. The print 28 is immediately sent to the printer 29 to have the time data such as the date, etc. recorded on the print 28 in accordance with the format information read out. After that, the print 28 is cut and produced from the printer 29 as the print 31. These actions are all performed under the control of the microcomputer 30. The data "a", "b" and "c" on the film 24 are read out by the camera 27. These data "a", "b" and "c" are stored by the microcomputer 30 along with the applicable frame number. The microcomputer 30 then prepares printing data according to the data thus obtained. The printing data is sent to the printer 29 to have the time data such as the date, etc., recorded on the applicable print in accordance with the format information read out. As a result, the print 31 is obtained with the data recorded thereon.

Referring to FIG. 10, the flow of the above-stated operation is as follows: At a step #11: A frame number is read from the film 24. At a step #12: The time data and the format information are read. At a step #13: The print 28 is made by the printing device 26. At a step #14: A check is made for a print number at the printer 29. At a step #15: The time data which is read at the step #12 is corrected as necessary according to the format information which has also been read at the step #12. At a step #16: The data thus corrected is printed on the applicable print.

In the case of this embodiment, seven-segment digit forming liquid crystal elements are used for recording data on the film. However, the invention is not limited to this arrangement. The arrangement may be changed to use some light emitting members like light emitting diodes for recording binary coded data.

Figure 11:
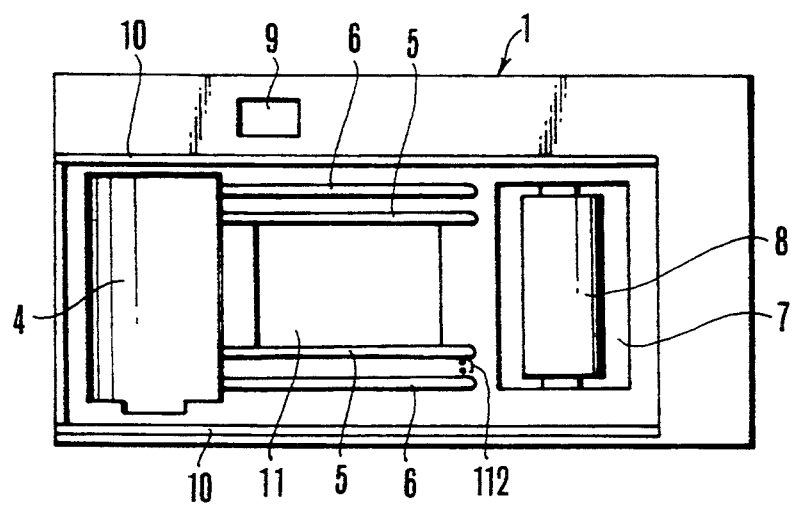
FIG. 11 is a rear view showing a camera arranged as a second embodiment of the invention, with the back lid of the camera removed.

A second embodiment of this invention is arranged as follows: FIG. 11 shows the camera of the second embodiment as viewed from behind with the back lid of the camera removed. The same component parts as those of FIG. 2 are indicated by the same reference numerals and the details of them are omitted from the following description. The oblique and the rear views of the camera of the second embodiment are identical with FIGS. 1 and 3 and are therefore also omitted.

Referring to FIG. 11, a plurality of light emitting members 112 (two in this case) is disposed near to the aperture 11. These light emitting members 112 are provided for imprinting on a film a plurality of data as codes. For example, light emitting diodes are employed as these light emitting members 112.

Figure 12:
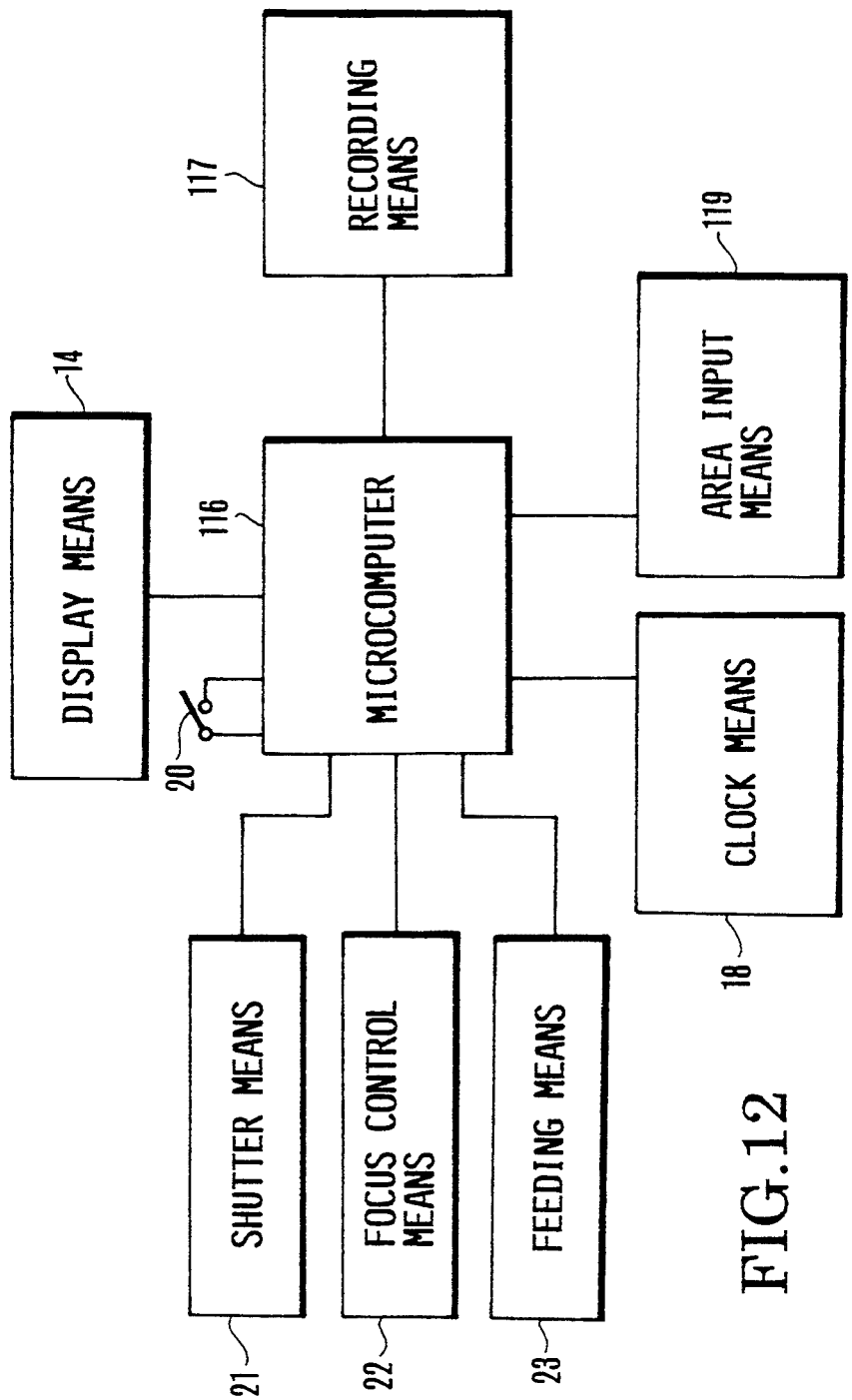
FIG. 12 is a block diagram showing the circuit arrangement of the camera of FIG. 11.

Next, referring to FIG. 12 which is a block diagram, the electric circuit arrangement of the second embodiment are as follows: In FIG. 12, the same component parts as those of FIG. 4 are indicated by the same reference numerals and the details of them are omitted from the following description. A microcomputer 116 is arranged to control the sequence of photographing actions of the camera, recording of time data such as the date and the area data and an interface between the camera and a peripheral circuit. Recording means 117 is arranged to imprint information including such information as the time data and the area data by means of the above-stated light emitting members 112. Area input means 119 is arranged such that the area data changes from one area over to another every time the button switch of operating means 15 is pushed and the area data is supplied to the microcomputer 116.

Figure 13:
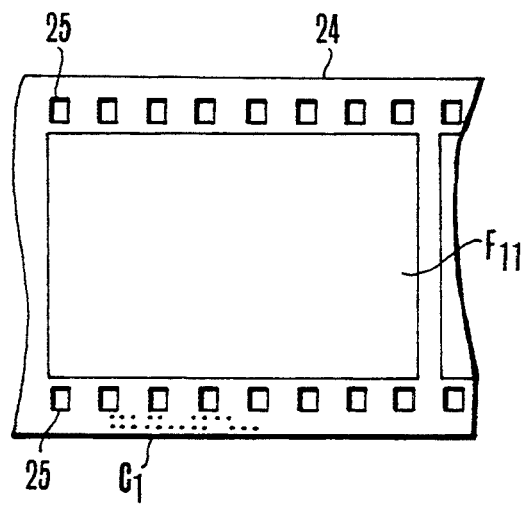
FIG. 13 is a plan view showing a photographing film.
Figure 14:
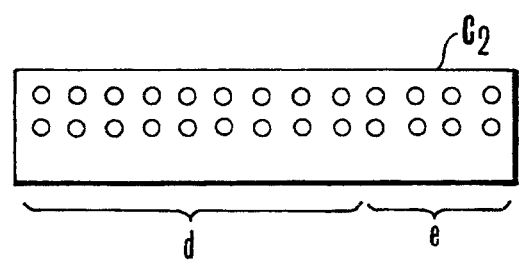
FIG. 14 is a plan view showing codes in an enlarged state.
Figure 15:
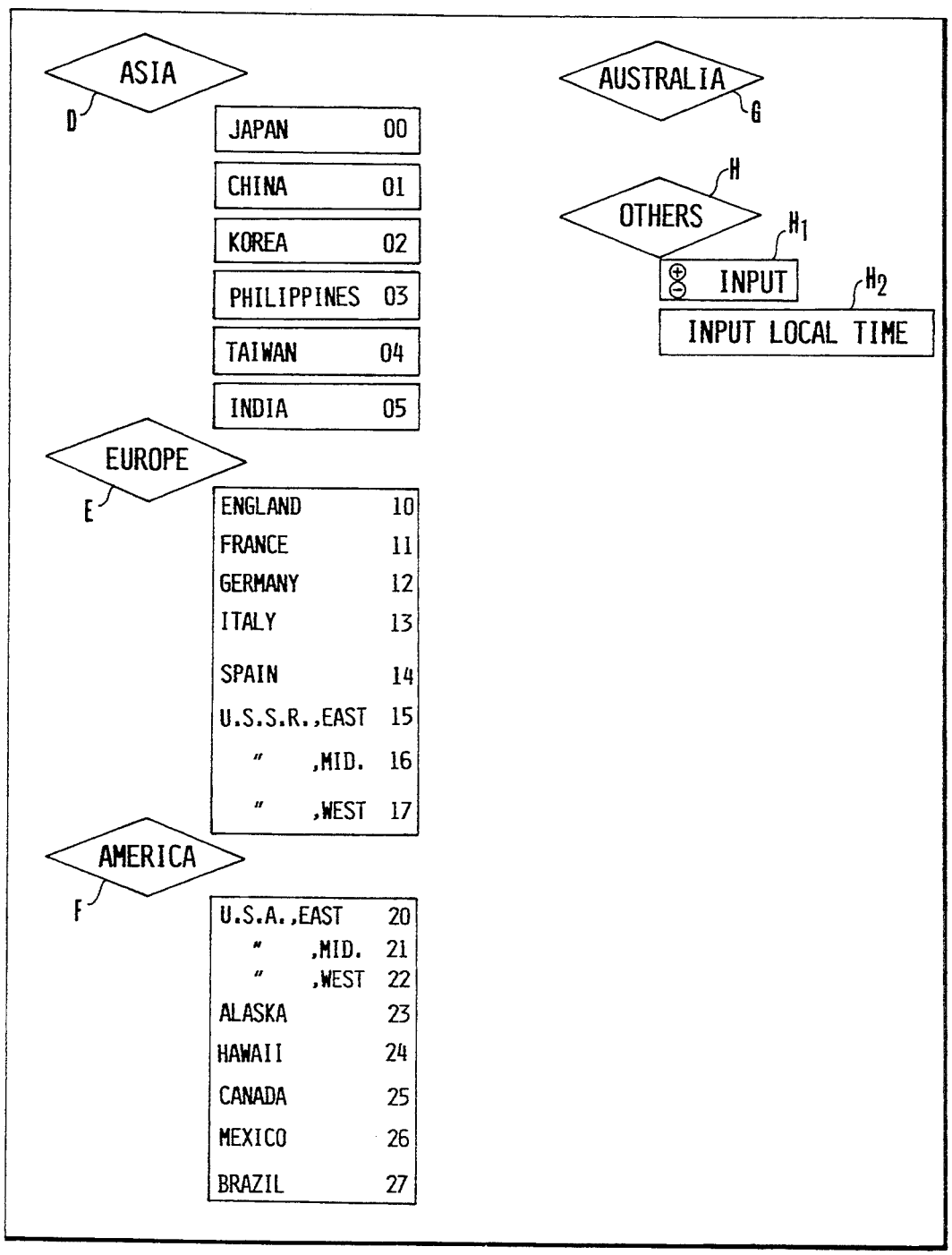
FIG. 15 shows by way of example the arrangement of area codes.

In recording the data on the film, the second embodiment operates as follows: FIG. 13 shows by way of example a film frame F11 on which the data is recorded in codes. FIG. 14 shows area codes in an enlarged plan view. FIG. 15 shows area codes by way of example. In FIG. 13, the same component parts as those of FIG. 5 are indicated by the same reference numerals and the details of them are omitted from the following description. In these figures, a reference symbol C1 denotes a code which corresponds to the frame F11. As shown, the code C1 is recorded on the outside of the frame F11. In the case of this (the second) embodiment, a plurality of codes C1 are aligned in two rows including upper and lower rows in the longitudinal direction of the film 24. They are arranged to be imprinted, for example, while the film is caused to travel by a film winding action, etc., by means of the upper and lower two light emitting members 112 mentioned in the foregoing. FIG. 14 shows the codes C2 as in a state of having all their dots imprinted. The codes C2 include a time code "d" for year, month, day, hour and minute and an area code "e". The time code "d" includes, for example, data for years 0 to 99, months 1 to 12, days 1 to 31, hours 0 to 23 and minutes 0 to 59. The area code "e" is arranged, for example, as shown in FIG. 15. Referring to FIG. 15, the whole world is divided into five blocks including Asia D, Europe E, America F, Australia G and others H. Further, the block Asia D is divided into six areas including Japan, China, Korea, Philippines, Taiwan and India. Different codes (00 to 05) are allotted to these Asian areas. The blocks Europe E and America F are likewise divided into areas with different codes allotted to these areas. The block Australia G is assigned to a single area in the case of this embodiment. However, since this area is wide, the block Australia G may be divided into a plurality of area. The block "Others" H is used in assigning an area code other than the blocks D, E, F and G. Further, a code H1 is assigned to first input means which is provided for advancing and delaying the time. Another code H2 is assigned to second input means which is for input of the local time of each area.

The film 24 on which both the time code "d" and the area code "e" are recorded is supplied to the printing device to be processed to have the local time and the applicable area name imprinted on a print. In other words, the codes recorded on the film 24 is read out before printing. After reading, the local time and the name of an area corresponding to these codes are imprinted on a print.

Figure 16:
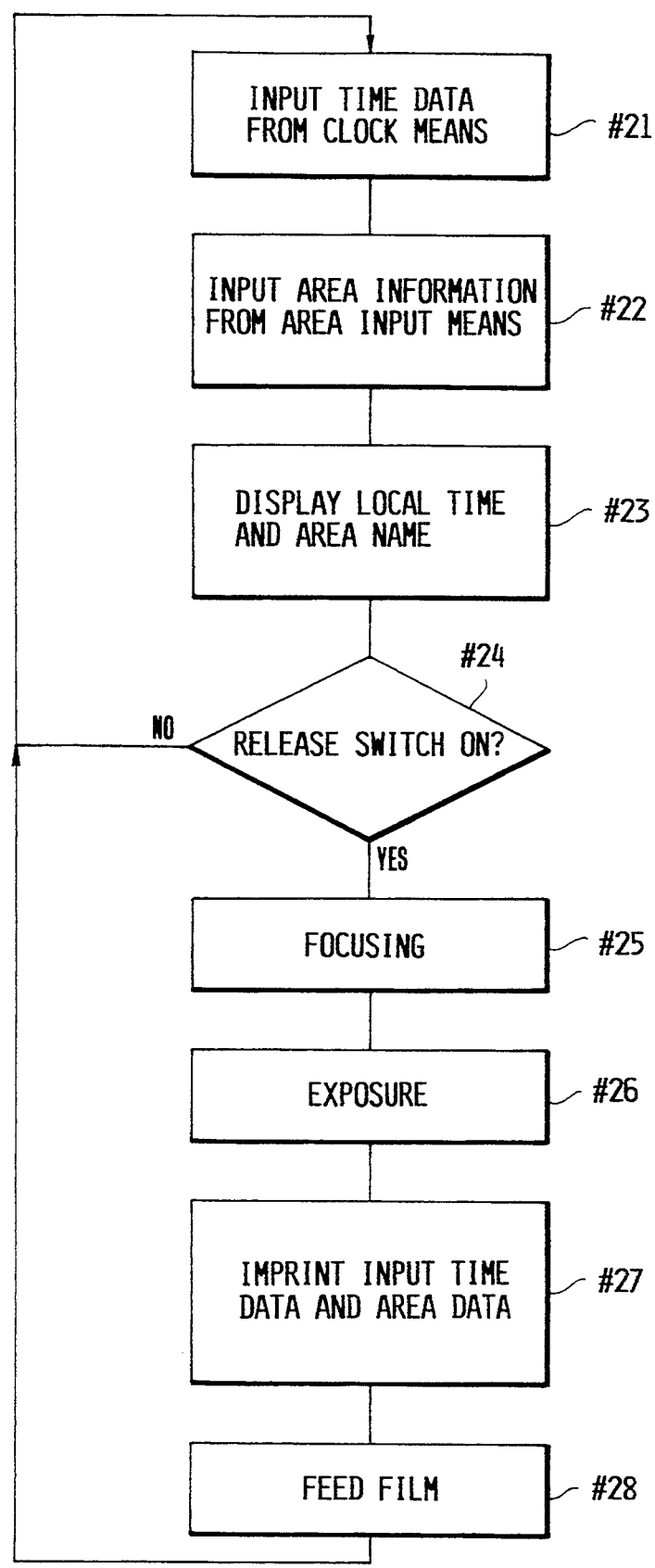
FIG. 16 is a flow chart showing the operation of the circuit arrangement shown in FIG. 12.

Referring to FIG. 16 which is a flow chart, the camera of the second embodiment operates as follows:

At a step #21: The time data for the year, month, day, hour, minute and second is supplied from the clock means 18 to the microcomputer 116. At a step #22: Following this, the microcomputer 116 receives from the area input means 119 one of the area data designated out of the areas shown in FIG. 15. At a step #23: The microcomputer 116 causes the display means 14 to display the time data and area data with the input time data corrected to the local time of the area on the basis of the area data. At a step #24: The microcomputer 116 makes a check to see if the release switch 20 is closed (on). If not, the flow of operation comes back to the step #21 to execute the steps #21 to #23 to have the display means 14 display the latest local time and the area name.

If the release switch 20 is found in an on-state at the step #24, the flow comes to a step #25. At the step #25: The focus control means 22 is allowed to perform a focusing action. At a step #26: The shutter means 21 is caused to make an exposure. At a step #27: The time data which is obtained before correction into the local time and the area data are imprinted in codes on the film surface. At a step #28: Upon completion of imprinting by the recording means 117, the film is fed by the film feeding means 23 for a next photographing operation. The flow of operation then comes back to the step #21 to repeat the above-stated steps.

Figure 17:
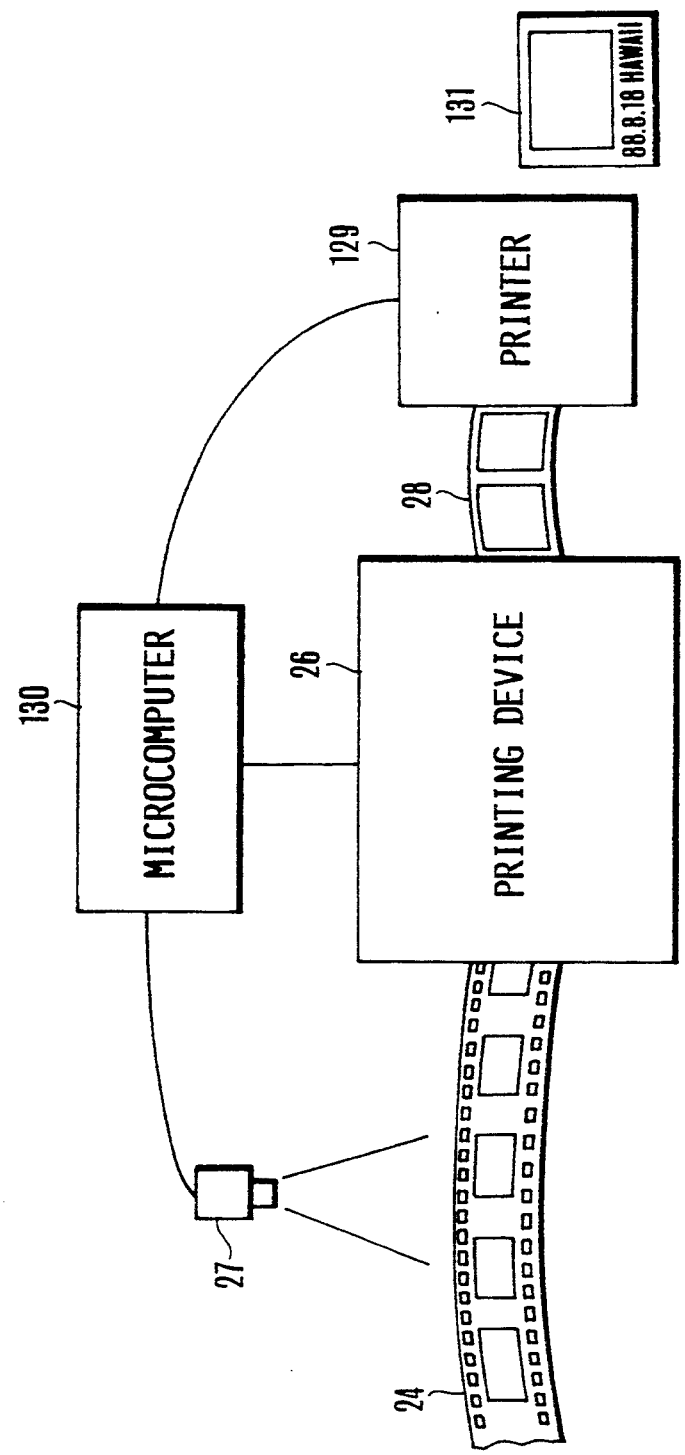
FIG. 17 is a schematic illustration of the printing device of another embodiment of the invention.

FIG. 17 schematically shows the arrangement of the printing device of the embodiment. In FIG. 17, the same parts as those of FIG. 9 are indicated by the same reference numerals and the details of them are omitted from the following description. Referring to FIG. 17, a printer 129 is arranged to record the local time and the area name on a print. A microcomputer 130 is arranged to control the printing device 26, the camera 27 and the printer 129.

The arrangement shown in FIG. 17 operates as follows: When the film 24 which has been developed with the data "d" and "e" imprinted therein comes to the printing device 26, a print 28 is obtained by printing on a printing paper. The print thus obtained is immediately supplied to the printer 129. At the printer 129, the local time data and the area data are recorded on the print. After that, the print is cut and produced as a print 131. These actions are all performed under the control of the microcomputer 130. The data "d" and "e" are read from the film 24 by the camera 27. The data "d" and "e" are then stored by the microcomputer 130 along with the frame number. The microcomputer 130 processes the time data thus obtained according to the area code mentioned in the foregoing. The local time data and the area data are sent to the printer 129. Then, information on the local time and the area name is recorded on the applicable print.

Figure 18:
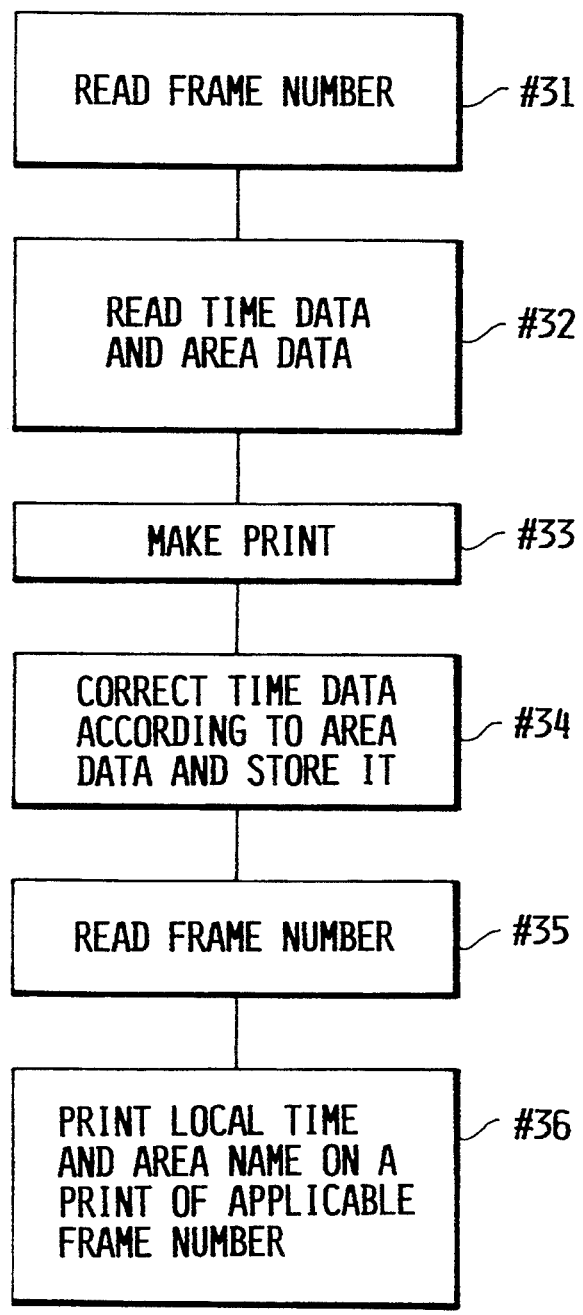
FIG. 18 is a flow chart showing the operation of the printing device of FIG. 17.

This operation is further described with reference to the flow chart of FIG. 18 as follows: At a step #31: A frame number is read from the film 24. At a step #32: Information on the time data and the area data is read. At a step #33: Printing is performed by the printing device 26. At a step #34: The time data read is corrected into local time data according to the area data. The local time data thus obtained is stored. At a step #35: The printer 129 reads the frame number from the print 28. At a step #36: The local time and the area name are printed on the print of the applicable frame number to obtain a print 131.

Figure 19:
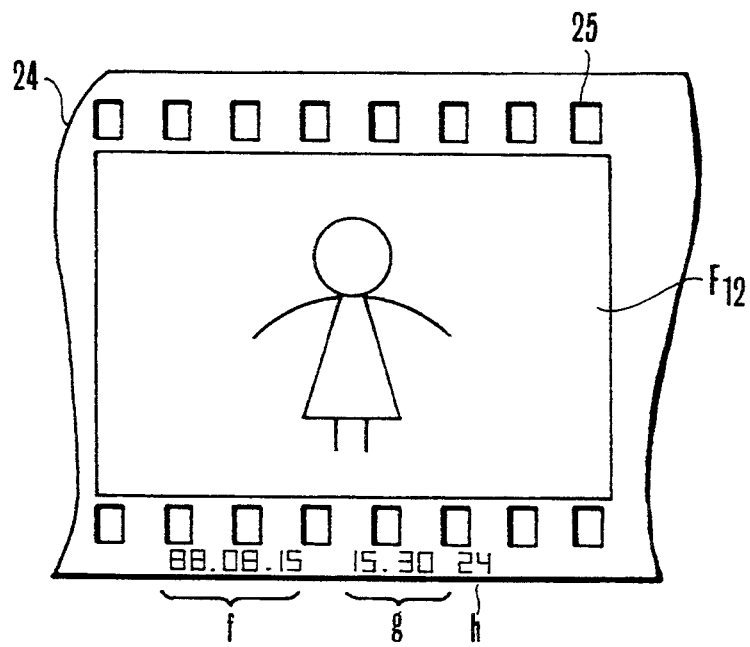
FIG. 19 is a plan view showing a frame F12 of film on which data is recorded.
Figure 20:
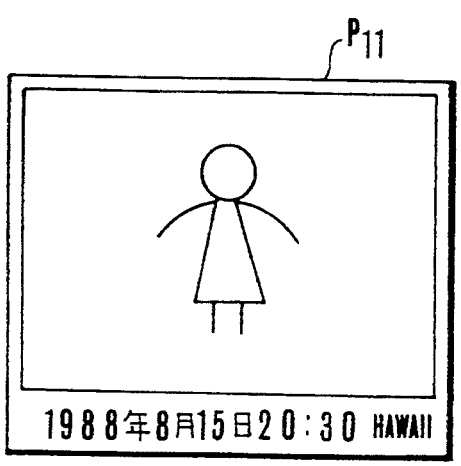
FIG. 20 is a plan view showing by way of example a print obtained from the frame F12.

The following describes a further embodiment:

FIGS. 19 and 20 show a third embodiment of the invention. FIG. 19 shows by way of example a film F12 with data recorded on the film 24. FIG. 20 shows by way of example a print obtained from the frame F12.

In these figures, parts similar to those of the second embodiment are indicated by the same reference numerals and the details of them are omitted from the following description. Referring to FIG. 19, a reference symbol F12 denotes the frame which has been used for photographing. A combination of data "f", "g" and "h" corresponds to the frame F12. The data "f", "g" and "h" are recorded on the outside of the frame F12 in the same manner as in the case of the second embodiment. The data "f" is for "year, month and day". The data "g" is for "hour and minute". The data "h" indicates the area. In the case of the second embodiment, the time data for "year, month and day", and "hour and minute" and the area data are arranged to be recorded on the film in the form of binary codes. However, in the third embodiment, seven-segment digits are used in the same manner as the date imprinting device of the conventional camera. This enables the conventional date imprinting device to be readily utilized for the embodiment. Further, since the data is imprinted on the outside of the frame of the film, the picture can be printed without being affected by the imprinted data.

FIG. 20 shows by way of example a print P11 which is obtained from the frame F12 shown in FIG. 19. The data is recorded on the outside of the picture in the case of the third embodiment. In this instance, data for "Aug. 15, 1988" is obtained and recorded from the above-stated data "f". The letters inserted in between figures make the imprint readily legible. Further, data for "20:30" is obtained and recorded from the data "g" and "h". Since the area code is for Hawaii in the case of the frame F12, the time "15 (hour) and 30 (minute)" is automatically changed to the local time of "20:30". Next, from the data "h", an area name of "Hawaii" is obtained and recorded. However, this may be recorded in some other letters or characters. Further, if the area code is more finely divided to include many sightseeing places, the name of a place such as "Miami" or "Niagra Falls" can be readily recorded by simply entering an applicable figure on the spot.

The third embodiment uses the same printing device as that of the second embodiment. The printing device is, therefore, omitted from description.

Further, both the second and third embodiments are arranged to use two light emitting diodes for recording data on the film. However, the invention is of course not limited to this. The light emitting diodes may be replaced with LCDs which are capable of displaying dots.

Further, the second and third embodiments are arranged to imprint on the film the original time data without adjusting it to the local time; and then to have this imprinted time data adjusted to the applicable local time according to the area data at the printing device before printing it on a print. This arrangement may be changed to automatically adjust the original time data to the local time data according to the area data on the side of the camera before it is imprinted on the film; and to have the imprinted local time data used as it is when it is printed on a print by the printing device.

In that instance, since the display means 14 displays the local time which is obtained by adjusting the time data according to the area data, the camera is allowed to imprint this local time data as it is on the film. Then, on the side of the printing device, the step #34 at which the time data read is corrected according to the area data can be omitted.

As regards a method for allowing the camera to obtain the area data, the camera may be provided with an input device for receiving the radio wave of air control, the area code signal of automobile telephone, an area code signal of an intersecting point, etc. or with a device for generating area codes.

While each of the embodiments described is arranged to record data directly on the film surface, the invention is not limited to that arrangement. For example, the arrangement may be changed to record data in a suitable place, such as the peripheral area, of a film cartridge containing the film; or to record data in some suitable recording means such as a memory card which is composed of a non-volatile memory such as a PROM, an EPROM or an EEPROM. Any recording means is usable for the purpose of the invention as long as it is usable in combination with the film as an ancillary to the latter in some suitable manner. Further, in accordance with this invention, the film also may be replaced with any other photographic photosensitive means.

What is claimed is:

1. A data recording camera and print making system comprising:
   a) camera first recording means for recording time data on a camera photographic photosensitive means or on a matter that is ancillary to the camera photographic photosensitive means;
   b) camera second recording means for recording, on a camera photographic photosensitive means or on a matter that is ancillary to the camera photographic photosensitive means, area data or language format information for use in printing said data recorded by said camera first recording means on a print; and
   c) printing means for making a print and for recording, on said print, said data recorded by said camera first recording means on the basis of said language format information recorded by said camera second recording means or for recording on said print, said data recorded by said camera first recording means on the basis of area data recorded by said camera second recording means.

2. A system according to claim 1, wherein said data recorded on said print is printed by said printing means in a language which is in accordance with said language format information recorded by said camera second recording means.

3. A system according to claim 1, wherein said printing means further includes computing means for receiving said time data and said area data and for correcting said received time data on the basis of said area data to provide corrected time data and wherein said printing means records only said corrected time data.

4. A system according to claim 1, wherein said area data is indicative of an area name and wherein said printing means includes means for printing, on said print, an area name based on area data recorded by said camera second recording means.

5. A data recording camera and print making system according to claim 1 in which the time data represents at least one of year, month, day and hour.

6. In combination:
   a) a camera comprising
      1) first indication means for indicating a time data,
      2) second indication means for indicating a print format for said data indicated by said first indication means or an area data; and
   b) a printing apparatus including
      1) input means for receiving said data indications of said first and second indication means of said camera, and
      2) printing means for performing printing according to said data indications received by said input means, said printing means printing time data in format according to the print format or correcting the time data according to the area data input by the input means and printing the corrected time data.

7. The invention claimed in claim 6, wherein said first indication means data indication is indicative of at least one of year, month, day, hour, minute and second as said time data.

8. The invention claimed in claim 6, wherein said first indication means includes means responsive to operation of said camera for indicating time data corresponding to a photographing time as said time data.

9. The invention claimed in claim 6, wherein said first indication means includes means for indicating said time data as a code information.

10. The invention claimed in claim 6, wherein said first indication means includes means for indicating said time data as a numerical indication.

11. The invention claimed in claim 6, wherein said second indication means includes means for indicating said print format as a code information.

12. The invention claimed in claim 6, wherein said second indication means includes setting means for setting said print format.

13. The invention claimed in claim 12, wherein said setting means includes selection means for selecting said print format.

14. The invention claimed in claim 6, wherein said printing apparatus further includes computing means for receiving said time data and said area data and for correcting said received time data on the basis of said area data to provide corrected time data.

15. The invention claimed in claim 6, wherein said second indication means includes setting means for setting said area data.

16. The invention claimed in claim 15, wherein said setting means includes selection means for selecting said area data.

17. The invention claimed in claim 6, wherein said printing means includes means for printing said time data in preselected correspondence to a photographic picture image.

18. The invention claimed in claim 17, wherein said camera further includes means for applying said data indication of at least one of said first and second indication means to a photographic film disposed in said camera.

19. The invention claimed in claim 18, wherein said camera data indication applying means is operable to apply said data indication to an area of said photographic film which is exterior to a film frame thereof within which a photograph is to be recorded.

20. The invention claimed in claim 18, wherein said camera data indication applying means is operable to apply to said photographic film both of said data indications of said first and second indication means.

21. The invention claimed in claim 18, wherein said camera data indication applying means is operable to apply said data indications of both of said first and second indication means to an area of said photographic film which is exterior to a film frame thereof within which a photograph is to be recorded.

22. The invention claimed in claim 17, wherein said camera further includes means for applying said data indication of at least one of said first and second indication means to an image recording medium disposed in said camera.

23. The invention claimed in claim 18, wherein said camera data indication applying means is operable to apply said data indication to an area of said image recording medium which is exterior to an image recording medium frame thereof within which an image is to be recorded.

24. The invention claimed in claim 6, further including first and second recording means for recording the respective data indications of said first and second data indication means.

25. The invention claimed in claim 24, wherein each of said first and second recording means comprises optical recording means.

26. The invention claimed in claim 6, further comprising display means for displaying said data indications of said first and second indication means.

27. A camera having facility for input thereto of time data and language print format or area data for said time data, said camera comprising:
   a) first indication means for indicating input time data,
   b) second indication means for indicating input language print format or input area data; and
   c) recording means for applying said indications of said first and second indication means to a photographic film.

28. A camera according to claim 27, wherein said first indication means data indication is indicative of at least one of year, month, day, hour, minute and second as said time data.

29. A camera according to claim 27, wherein said first indication means includes means responsive to operation of said camera for indicating time data corresponding to a photographing time as said time data.

30. A camera according to claim 27, wherein said first indication means includes means for indicating said time data as a code information.

31. A camera according to claim 27, wherein said first indication means includes means for indicating said time data as a numerical indication.

32. A camera according to claim 27, wherein said second indication means includes means for indicating said language print format as a code information.

33. A camera according to claim 27, wherein said second indication means includes setting means for setting said language print format.

34. A camera according to claim 33, wherein said setting means includes selection means for selecting said language print format.

35. A camera according to claim 27, wherein said printing means includes means for printing said time data in preselected correspondence to a photographic picture image.

36. A camera according to claim 35, wherein said camera further includes means for applying said data indication of at least one of said first and second indication means to a photographic film disposed in said camera.

37. A camera according to claim 36, wherein said camera data indication applying means is operable to apply to said photographic film both of said data indications of said first and second indication means.

38. A camera according to claim 35, wherein said camera further includes means for applying said data indication of at least one of said first and second indication means to an image recording medium disposed in said camera.

39. A camera according to claim 27, wherein said recording means includes first and second recorders for recording the respective data indications of said first and second data indication means.

40. A camera according to claim 39, wherein each of said first and second recorders comprises optical recording means.

41. A camera according to claim 27, wherein said second indication means includes means for indicating the area data as a code information.

42. A camera according to claim 27, wherein said second indication means includes setting means for setting the area data.

43. A camera according to claim 42, wherein said setting means includes selection means for selecting the area data.

44. A data recording camera and print making system comprising:
   a) camera first recording means for recording time data on a camera photographic photosensitive means;
   b) camera second recording means for recording on a camera photographic photosensitive means language format information or area data for use in printing said data recorded by said camera first recording means on a print; and
   c) printing means for making a print and for recording, on said print, said data recorded by said camera first recording means on the basis of the language format information recorded by said camera second recording means or for recording on said print, said data recorded by said camera first recording means on the basis of the area data recorded by said camera second recording means.

45. A data recording camera and print system according to claim 44, where the camera photographic photosensitive means includes a photosensitive film.

46. A data recording camera and print system according to claim 45, where the camera photographic photosensitive means is a surface of a photosensitive film.

47. A camera having facility for input thereto of time data and language print format or area data for said time data, said camera comprising:
   a) first indication means for indicating input time data;
   b) second indication means for indicating input language print format or area data; and
   c) recording means for applying said indications of said first and second indication means to a photographic photosensitive means or a matter that is ancillary to the photographic photosensitive means.

48. A device for recording data of a camera, comprising:
   a) first indicating means for indicating data relative to time;
   b) second indicating means for indicating format second information of the data relative to time; and
   c) recording means for recording the indications of the first and second indicating means separately on a matter ancillary to an image recording medium or on the image recording medium, and for enabling a printer, after reading out separately the recording contents, to print the indication of the first indicating means in accordance with the indication of the second indicating means.

49. A device according to claim 48, wherein said recording means includes means for recording the indications of said first and second indicating means on a photographic film.

50. A device according to claim 48, wherein said second indicating means includes means for indicating to print the data relative to time in a format.

51. A device according to claim 48, wherein said second indicating means includes means for indicating to print the data relative to time according to the time corresponding to the area information.

52. A camera, comprising:
a) first indicating means for indicating data relative to time;
b) second indicating means for indicating format second information of the data relative to time; and
c) recording means for recording the indications of the first and second indicating means separately on a matter ancillary to an image recording medium or on the image recording medium, and for enabling a printer, after reading out separately the recording contents, to print the indication of the first indicating means in accordance with the indication of the second indicating means.

53. A camera system, comprising:
(A) a camera comprising:
a) first indicating means for indicating data relative to time;
b) second indicating means for indicating format of the data relative to time;
c) recording means for recording the indication of said first and second indicating means separately on a matter ancillary to an image recording medium;
(B) a printer comprising:
a) reading-out means for reading out the indications of the first and second indicating means separately recorded by said recording means; and
b) printing means for printing on the basis of the indications of the first and second indicating means separately read out by said reading-out means, said printing means printing the indication of the first indicating means according to the indicating means of the second indicating means.

54. A printer comprising:
a) reading-out means for reading out separately first data containing data relative to time separately recorded on an image recording medium or on a matter ancillary to the image recording medium and second data containing format information or area information of the first data; and
b) printing means for printing according to the first and second data read out by said reading-out means, said printing means printing contents of the first data according to contents of the second data.

55. A printing apparatus comprising:
a) input means for receiving from a camera
 (1) time data, and
 (2) indication of a print format for said received data or area data; and
b) printing means for printing said received data in accordance with said received format indication or for printing a corrected time data in accordance with said time and area data.

56. A data recording camera and print making system according to claim 55 in which the time data represents at least one of year, month, day and hour.

57. A data recording device, comprising:
a) first indicating means for indicating data;
b) second indicating means for indicating one or more of language-related characteristics and area data; and
c) recording means for recording a first information indicated by said first indicating means and a second information indicated by said second indicating means on one of an image recording medium or an apparatus accessory to the recording medium.

58. A device according to claim 57, wherein the accessory apparatus is a printing device and wherein said second indicating means includes means for indicating a language format according to which said printing device prints said first information.

59. A device according to claim 58, wherein said second indicating means further includes means for indicating a language according to which said printing device prints said first information in said language format.

60. A device according to claim 57, wherein the accessory apparatus is a printing device and wherein said first indicating means includes means for indicating time data and wherein said second indicating means includes means for indicating area data, said printing device including means for modifying the indicated time data in accordance with the indicated area data, said printing device printing the modified time data.

61. A device according to claim 57, wherein the accessory device is a printing device and wherein said recording means records the first information indicated by said first indicating means and the second information indicated by said second indicating means in such a manner that the printing device can read the recorded information and perform printing in accordance therewith.

62. A device according to claim 57, wherein said recording means includes means for recording the first information indicated by said first indicating means and the second information indicated by said second indicating means on a film.

63. An optical apparatus, comprising:
a) first indicating means for indicating data;
b) second indicating means for indicating one or more of language-related characteristics and area data; and
c) control means for causing a recording unit to record the first information indicated by said first indicating means and the second information indicated by said second indicating means on one of a recording medium and an apparatus accessory to the recording medium.

64. An apparatus according to claim 63, which further comprises a recording unit.

65. An apparatus according to claim 63, wherein the optical apparatus is a camera.

66. A control device for use in data recording, comprising:
a) first indicating means for indicating data;
b) second indicating means for indicating one or more of language-related characteristics and area data; and
c) control means for causing a recording unit to record the first information indicated by said first indicating means and the second information indicated by said second indicating means on one of a recording medium and an apparatus accessory to the recording medium.

* * * * *